Figure 3:
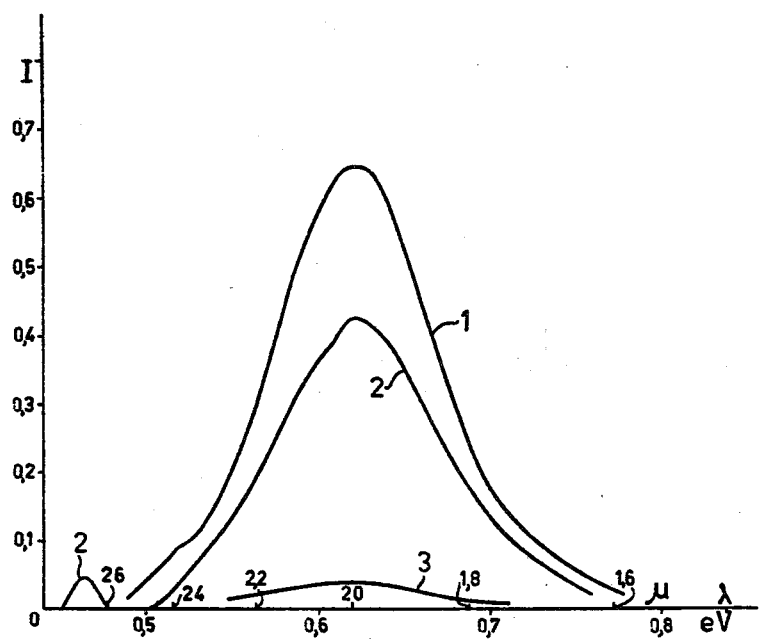

Nov. 5, 1963　　　M. AVINOR　　　3,109,818
INFRARED PHOSPHORS USING VANADIUM AS AN ACTIVATOR
Filed Aug. 2, 1960　　　　　　　2 Sheets-Sheet 1
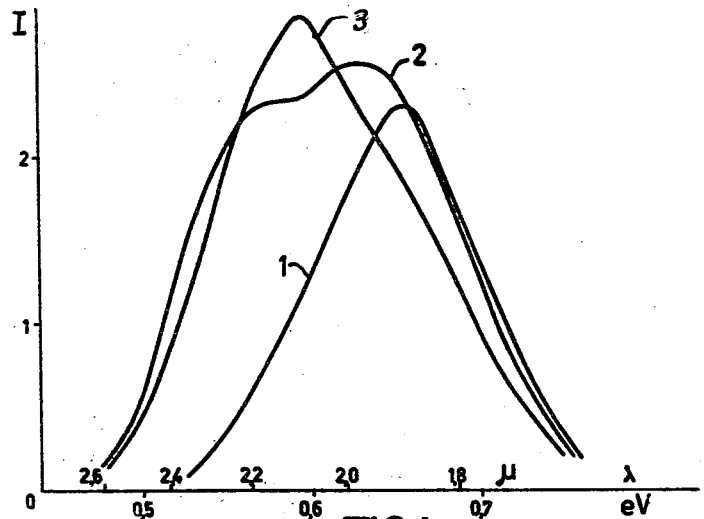
FIG. 1
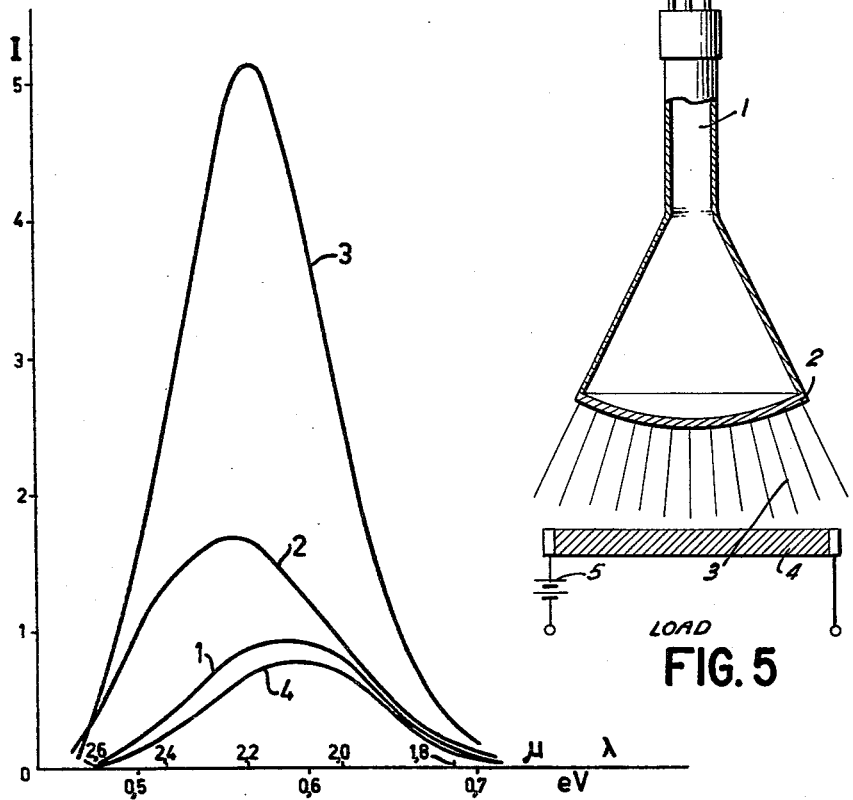
FIG. 2
FIG. 5
INVENTOR
Michael Avinor
BY
Frank R. Trifari
AGENT United States Patent Office 3,109,818
Patented Nov. 5, 1963

3,109,818
INFRARED PHOSPHORS USING VANADIUM AS AN ACTIVATOR
Michael Avinor, Haifa, Israel, assignor to North American Philips Company, Inc., New York, N.Y., a corporation of Delaware
Filed Aug. 2, 1960, Ser. No. 46,963
Claims priority, application Netherlands Aug. 11, 1959
4 Claims. (Cl. 252—301.6)

This invention relates to new and novel phosphors emitting radiation solely within the infrared region and to sources of infrared radiation containing such phosphors.

The art has long needed a source of infrared radiation in which no filters are required to remove undesired radiation. Up to the present no such source has been presented.

It is a principal object then of this invention to provide a source of infrared radiation needing no filter.

This and other objects of this invention will be apparent from the description that follows.

According to the invention it has been found that the sulfate free phosphors consisting essentially of a compound of at least one element selected from the group consisting of zinc and cadmium and at least one element selected from the group consisting of sulfur, selenium and tellurium activated with from $10^{-2}$ to $10^{-6}$ atoms vanadium per mol of compound have the very unusual and important property of emitting only in the long infrared region with a maximum between 1.8 to 2.4$\mu$.

These novel phosphors exhibit this emission when excited by electromagnetic ultraviolet radiation such as visible light or corpuscular radiation such as electrons. Thus these phosphors may be excited by radiation from incandescent lamps, luminescent lamps, ultraviolet lamps, sodium vapour lamps, cathode ray tubes, mercury vapour lamps and X-rays among others.

Thus in combination with these exciting sources the phosphors of the invention may be employed as a source of infrared rays for use in the infrared analysis of chemicals and in switching devices an example of which comprise the combination of an incandescent lamp or other light producing device which operates only above a certain voltage level, an infrared emitting phosphor of the invention and an infrared sensitive semiconductive material an example of which is lead sulfide as this material has a maximum excitation at about 2.5$\mu$.

The absorption of the exciting radiation and the yield of the conversion may be improved by incorporating in the vanadium-activated compounds as a coactivator one or more of the elements copper, silver or gold. The content of these activators should likewise be between from $10^{-2}$ to $10^{-6}$ atoms per mol of compound. These coactivators exert only a small influence on the place of the peak of the emission.

The activator and co-activator content is preferably chosen between $5.10^{-5}$ and $5.10^{-4}$ atoms per mol of compound, the strongest emission being obtained with these amounts.

The novel phosphors of the invention may be prepared in a manner corresponding to the known modes of preparing other sulphides, selenides and tellurides.

The invention will now be described in greater detail with reference to the following example and the accompanying drawing FIGURES 1 to 4 of which shows emission curves of representative phosphors of the invention and FIGURE 5 of which represents a lead sulfide switch employing as the activating agent infrared rays from a lamp coated with a phosphor of the invention.

Example

A mixture was prepared of 100 g. of pure ZnS, 20 mls. of a solution of ammonium metavanadate containing 0.525 g. per l. of vanadium and 20 mls. of a solution of silver nitrate containing 1.11 g. of silver per l. After thoroughly stirring, this mixture was dried at a temperature between 80° C. and 150° C. The dried product was transferred to a quartz vessel and then heated at 1100° C. for two hours in an atmosphere of dry hydrogen sulphide. After cooling, the fired product was ground and homogenized. The homogeneous product was then again heated under the same conditions and for the same period. After cooling, the resulting product was ground and sieved. The resulting infrared-radiating substance was then ready for use.

To improve the crystal structure of the fired product, use may be made of substances which are in themselves known as fluxes, for example chlorides or fluorides of the alkali metals.

To prepare selenides, tellurides or mixed compounds of the elements zinc and cadmium, entirely the same process as described above may be followed. In the case of cadmium selenide, the heating temperature is preferably chosen at about 950° C.

The selenides are preferably heated in an atmosphere of selenium hydrogen, to which a quantity of hydrogen or nitrogen has been added. The tellurides are preferably heated in an atmosphere of hydrogen or nitrogen.

Figure 4:
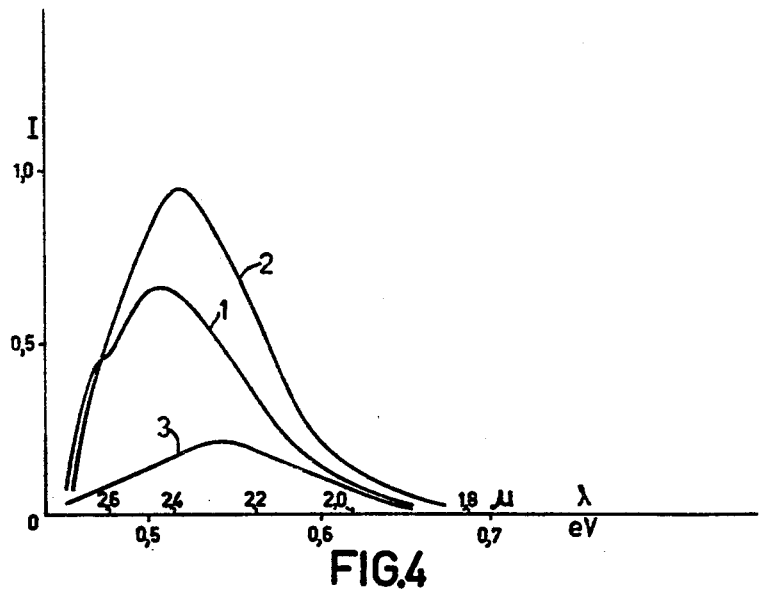

The emission of representative phosphors of the invention will now be illustrated with reference to the accompanying drawing, in which FIG. 1 shows the emission curves of zinc sulphide with various activators and co-activators, FIG. 2 shows the emission curves of cadmium sulphide with various activators and co-activators, FIG. 3 shows the emission curves of zinc selenide with various activators and co-activators, and FIG. 4 shows the emission curves of cadmium selenide with various activators and co-activators.

In the diagrams of the figures, both the wave length in microns and the photo-energy in e.v. is plotted on the abscissa. On the ordinate of the diagrams, the intensity is plotted of the emitted radiation. For all the figures, the intensity is measured with reference to the same standard at room temperature.

In all the compounds of which the emission curves are shown in the figures, the content of activator and possibly coactivator amounted to $2 \times 10^{-4}$ atoms per mol of compound.

Curve 1 of FIG. 1 shows the emission of zinc sulphide activated with vanadium, curve 2 the emission of zinc sulphide activated with vanadium and co-activated with silver. Curve 3 shows the emission of zinc sulphide activated with vanadium and co-activated with copper.

Curve 1 of FIG. 2 shows the emission of cadmium sulphide activated with vanadium, curve 2 the emission of cadmium sulphide activated with vanadium and co-activated with silver, curve 3 the emission of cadmium sulphide activated with vanadium and co-activated with copper and curve 4 the emission of cadmium sulphide activated with vanadium and co-activated with gold.

Curve 1 of FIG. 3 shows the emission of zinc selenide activated with vanadium, curve 2 the emission of zinc selenide activated with vanadium and co-activated with silver and curve 3 the emission of zinc selenide activated with vanadium and co-activated with copper.

Curve 1 of FIG. 4 shows the emission of cadmium selenide activated with vanadium and co-activated with silver, curve 2 the emission of cadmium selenide activated with vanadium and co-activated with copper and curve 3 the emission of cadmium selenide activated with vanadium.

An illustration of a practical example of a switching device employing one of the phosphors of the invention is shown in FIGURE 5. In the device shown in this FIGURE 1 represents a source of electrons such as a cathode ray tube internally coated with a layer of a phosphor of the invention such as cadmium selenide activated with vanadium and co-activated with copper, 4 represents a layer of photosensitive lead sulfide positioned to receive the infrared rays from the phosphor 2 and thereby be sufficiently conductive to allow current from the battery 5 to pass to the load. In the operation of this device electrons produced in the cathode ray tube 1 impinge on the phosphor layer 2 thereby causing said phosphor to produce infrared rays 3 which impinge on the layer of lead sulfide thereby increasing the conductivity of the lead sulfide layer and allowing current to pass from the battery 5 to the load.

While I have described my invention in connection with specific embodiments and applications, other modifications thereof will be readily apparent to those skilled in this art, without departing from the spirit and scope of the invention as defined in the appended claims.

What is claimed is:

1. An infrared emitting phosphor consisting essentially a sulfate free compound of at least one element selected from the group consisting of zinc and cadmium and at least one element selected from the group consisting of sulphur, selenium and tellurium activated with from $10^{-2}$ to $10^{-6}$ atoms of vanadium per mol of said compound.

2. The infrared emitting phosphor of claim 1, wherein from $10^{-2}$ to $10^{-6}$ atoms of at least one of the elements of the group consisting of copper, silver and gold per mol of said compound are present as a co-activator.

3. The infrared emitting phosphor of claim 2, wherein per mol of compound from $5.10^{-5}$ to $5.10^{-4}$ atoms of vanadium are present.

4. The infrared emitting phosphor of claim 3, wherein per mol of the compound from $5.10^{-5}$ to $5.10^{-4}$ atoms of at least one of the elements of the group consisting of copper, silver and gold are present.

References Cited in the file of this patent

UNITED STATES PATENTS

| | | |
|---|---|---|
| 2,222,668 | Knoll | Nov. 26, 1940 |
| 2,424,454 | Gordon | Jan. 22, 1947 |
| 2,650,311 | Bray | Aug. 25, 1953 |
| 2,742,631 | Rajckman et al. | Aug. 17, 1956 |